US 8,074,607 B2

(12) United States Patent
Campbell

(10) Patent No.: US 8,074,607 B2
(45) Date of Patent: Dec. 13, 2011

(54) BRISKET BARRIER

(75) Inventor: Bob Campbell, County Antrim (GB)

(73) Assignee: J. Wilson Agricultural Ltd, Londonderry (IE)

( * ) Notice: Subject to any disclaimer, the term of this patent is extended or adjusted under 35 U.S.C. 154(b) by 846 days.

(21) Appl. No.: 11/859,025

(22) Filed: Sep. 21, 2007

(65) Prior Publication Data

US 2008/0072839 A1 Mar. 27, 2008

(30) Foreign Application Priority Data

Sep. 21, 2006 (GB) .................................. 0618587.0

(51) Int. Cl.
A01K 1/00 (2006.01)
(52) U.S. Cl. ....................................................... 119/523
(58) Field of Classification Search ............... 119/14.03, 119/516, 522, 523, 525; 404/6, 7
See application file for complete search history.

(56) References Cited

U.S. PATENT DOCUMENTS

| 3,636,829 | A | * | 1/1972 | Palmer | 404/7 |
| 5,639,179 | A | * | 6/1997 | Jensen | 404/6 |
| 5,882,140 | A | * | 3/1999 | Yodock et al. | 404/6 |
| D421,321 | S | | 2/2000 | Foxworthy | |
| D520,191 | S | * | 5/2006 | Staal | D30/119 |
| D607,611 | S | * | 1/2010 | Nilsson | D30/119 |
| 7,794,103 | B2 | * | 9/2010 | Hoover | 362/153.1 |

* cited by examiner

Primary Examiner — Rob Swiatek
Assistant Examiner — Valentina Xavier
(74) Attorney, Agent, or Firm — Gardner, Linn, Burkhart & Flory, LLP

(57) ABSTRACT

A brisket barrier for an animal stall comprises a ridge-shaped body having recessed sections formed therein and extending into the ridge. The recessed sections include a transversely extending slot adapted to receive a fixing device such as a screw. The recessed sections include a base portion in which the slot is formed, the base portion being arranged to engage with, in use, a ground surface on which said barrier is mounted. The barrier is adjustable, when fitted, in a direction perpendicular to its longitudinal axis.

19 Claims, 7 Drawing Sheets

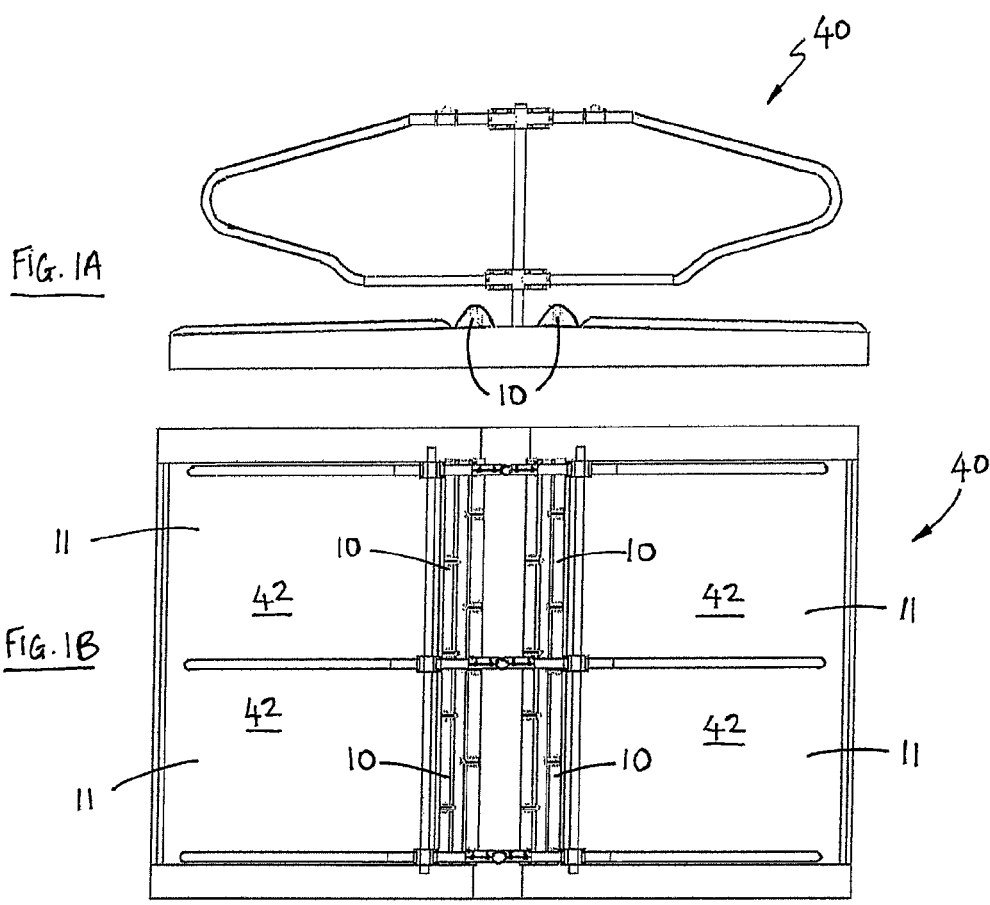
FIG. 1A
FIG. 1B
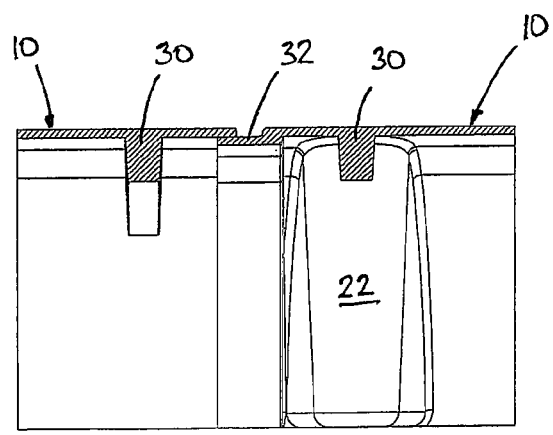
FIG. 3

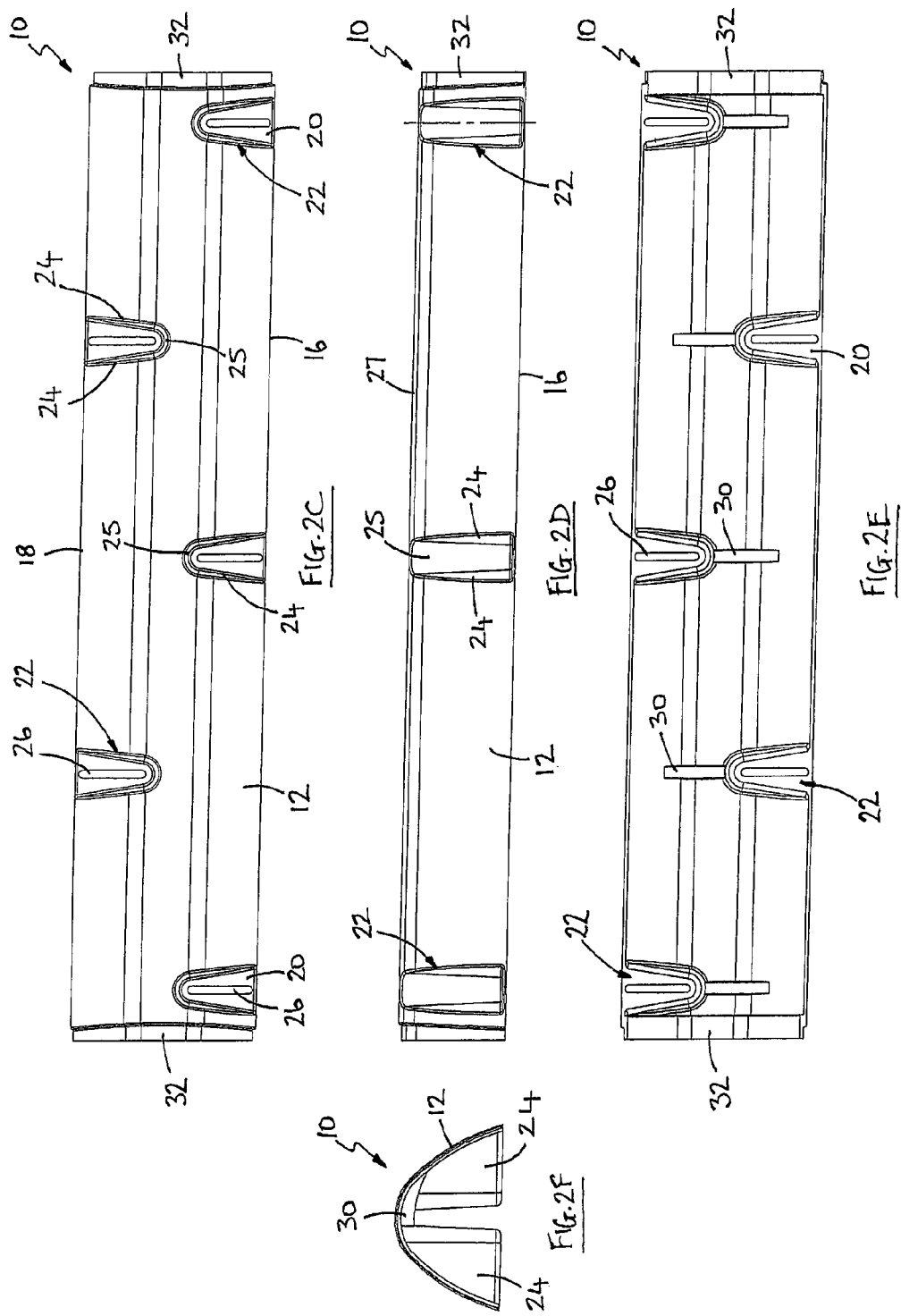

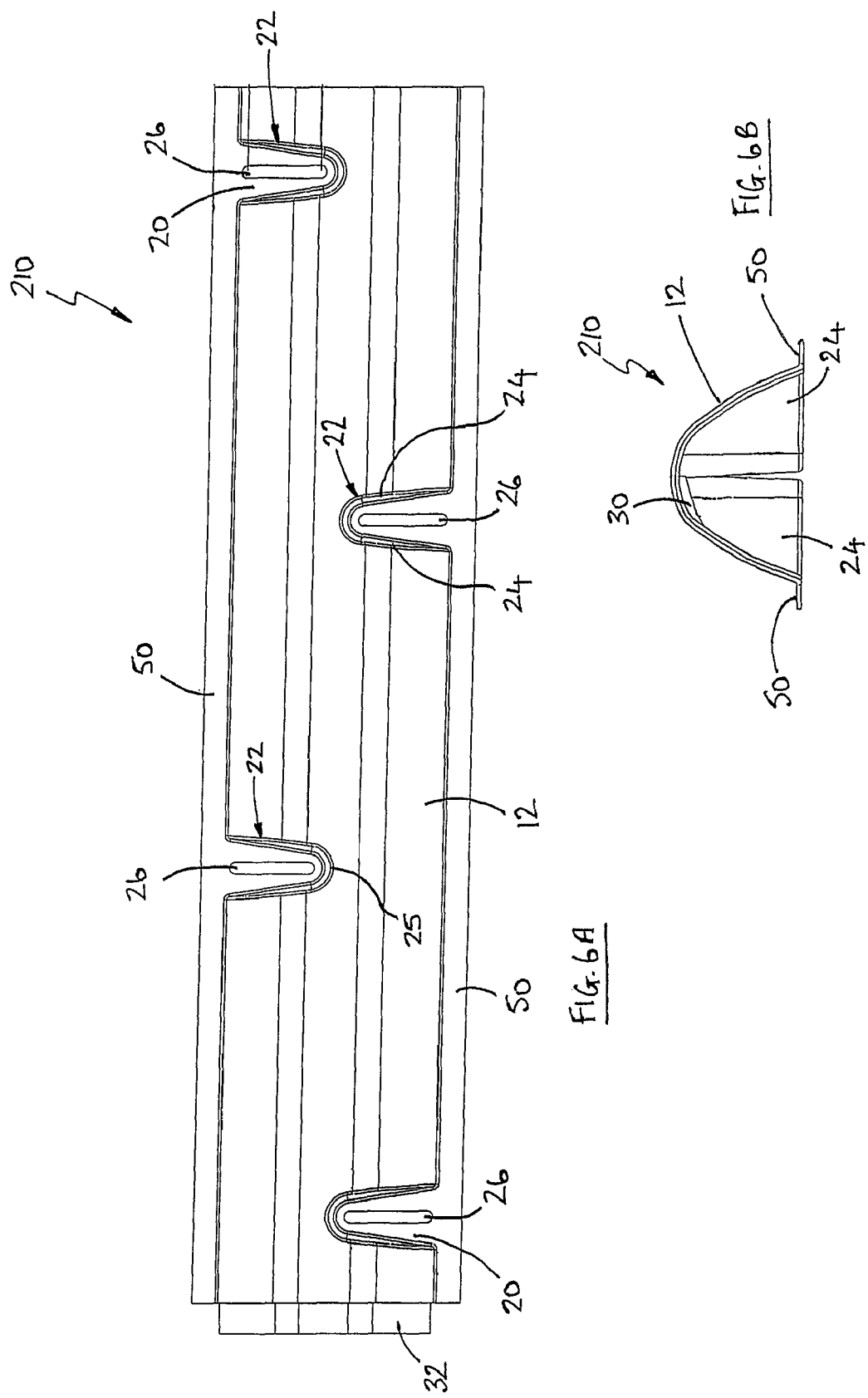

BRISKET BARRIER

FIELD OF THE INVENTION

The present invention relates to barriers for use in animal stalls.

BACKGROUND TO THE INVENTION

A brisket barrier is a barrier for helping to correctly position an animal within an animal stall. The barrier is typically located at the front of the stall, that is the end of the stall where the animal's head is located during use, and extends transversely of the stall.

Some animals, in particular cows, tend to lie down with either one or both front legs naturally extended. Some conventional brisket barriers discourage or do not allow this natural leg extension. In addition, conventional brisket barriers are usually fixed with respect to the stall and so can be difficult and time consuming to reposition.

It would be desirable to provide a brisket barrier that mitigates the problems identified above.

SUMMARY OF THE INVENTION

A first aspect of the invention provides a barrier for an animal stall, the barrier comprising a body shaped to define a ridge, the body having at least one recessed section formed therein and extending into said ridge, said at least one recessed section including at least one aperture formed therein and adapted to receive a fixing device.

In typically embodiments, the barrier may be said to comprise a brisket barrier.

In the preferred embodiment, the body has a first and a second, in use, lower edge, one on either side of the ridge and extending longitudinally of the ridge, each recess being defined by an in use base section or plate which is preferably disposed substantially parallel with, or coplanar with, said edges. Said plates are preferably substantially flat and coplanar with said edges and so provide a ground engaging surface for the barrier.

Said at least one aperture preferably takes the form of an elongate slot running substantially perpendicular with the longitudinal axis of the body.

Each recess preferably includes an end wall at one end of said base section or plate distal a respective one of said edges, the end wall preferably having a curved transverse cross-section.

In the preferred embodiment, the barrier includes at least one recess formed in either side of said ridge. Advantageously, said recesses are located alternately, and preferably substantially evenly spaced, on one side and then the other of said ridge in a longitudinal direction.

In a typical mode of use, a plurality of brisket barriers are positioned in an end-to-end manner to create a longer brisket barrier. To this end, means for connecting adjacent brisket barriers in use is provided, for example by way of a male and female engagement means.

A second aspect of the invention provides an animal stall assembly comprising at least one animal stall having at least one of said barriers.

As will be seen from the following description of a specific embodiment, the advantages of preferred embodiments of the invention include that the brisket barrier requires less fixing to the stall and is therefore faster to fit; that the position of the brisket barrier with respect to the stall is readily adjustable; that the brisket barrier is less likely to bend or bow under pressure from an animal; and that the cost of production is relatively low.

Further advantageous aspects of the invention will become apparent to those ordinarily skilled in the art upon review of the following description of a specific embodiment and with reference to the accompanying drawings.

BRIEF DESCRIPTION OF THE DRAWINGS

An embodiment of the invention is now described by way of example and with reference to the accompanying drawings in which like numerals are used to indicate like parts and in which:

FIG. 1A shows a side view of an animal stall assembly including brisket barriers embodying the invention;

FIG. 1B shows a plan view of the animal stall assembly of FIG. 1A;

FIGS. 2C to 2F show respectively top, side, bottom and cross sectional views of the brisket barrier of FIG. 2A;

FIG. 3 shows a side view of the interface between two interconnected brisket barriers;

FIGS. 6A and 6B show a plan and a side view respectively of a third embodiment of a brisket barrier.

DETAILED DESCRIPTION OF THE DRAWINGS

Figure 2A:
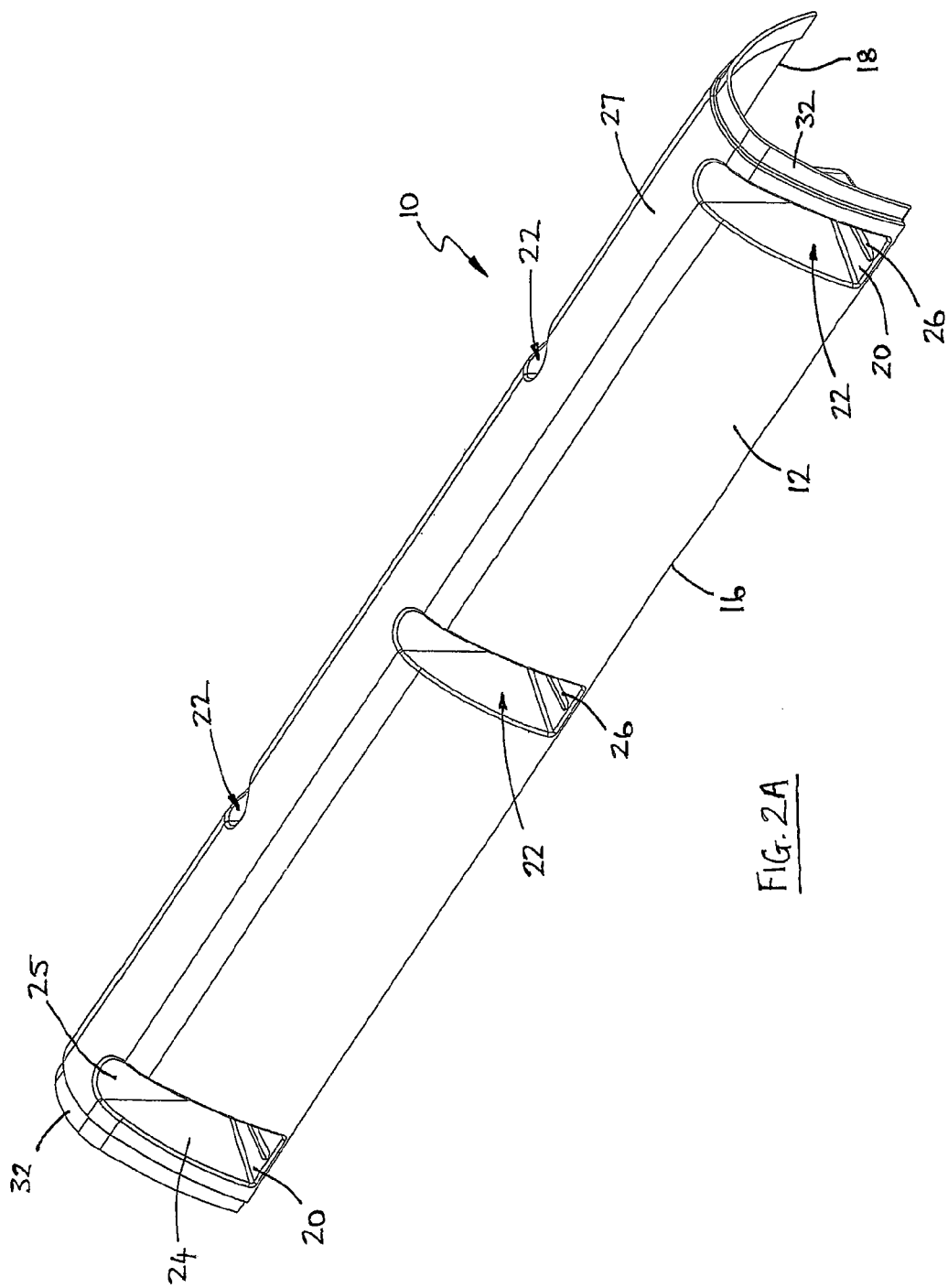
FIG. 2A shows a perspective view of the brisket barrier of FIG. 1.
Figure 2B:
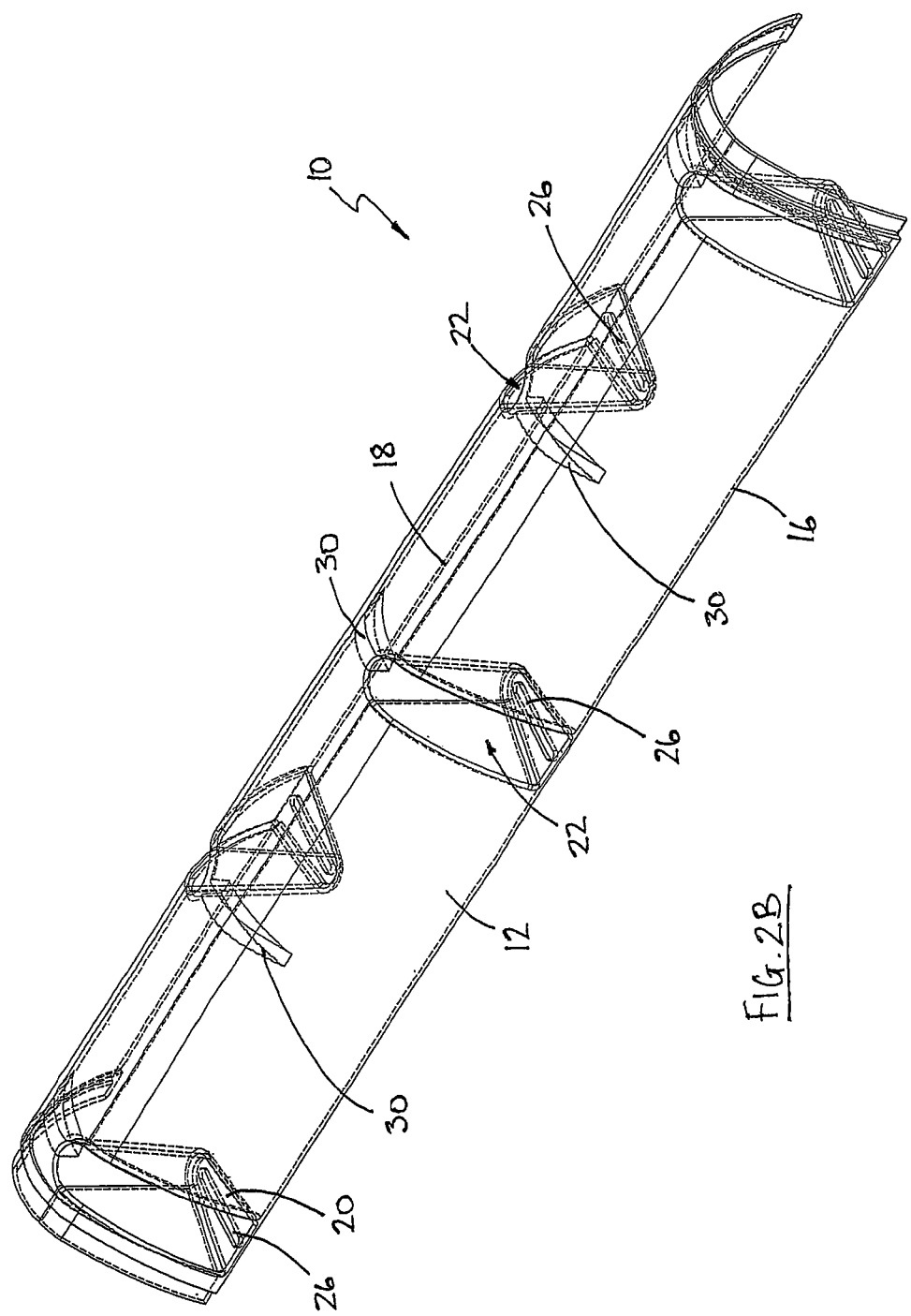
FIG. 2B shows a perspective view of the brisket barrier of FIG. 2A, with hidden features being indicated by dashed lines.
Figure 4:
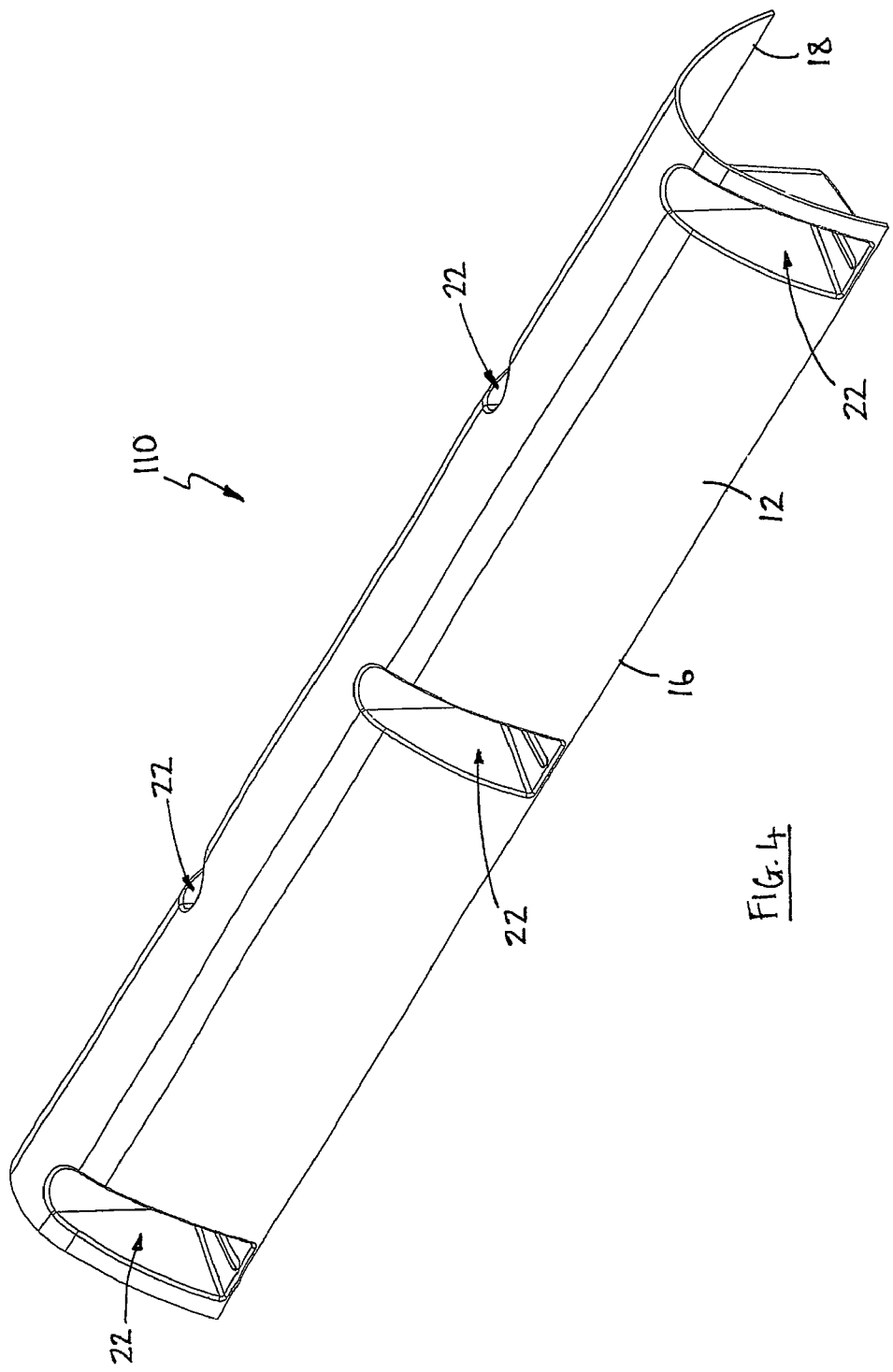
FIG. 4 shows a perspective view of a second embodiment of a brisket barrier.

Referring now to FIGS. 1A and 1B of the drawings, there is shown, generally indicated as 40, an animal stall assembly including barriers 10 embodying the invention. The animal stall assembly 40 includes a plurality of animal stalls 11 (4 shown in FIG. 1B) such as may be used in, for example a cattle house or milking parlour. The barriers 10 are particularly suited for use in cow stalls (often referred to as cow cubicles) and may be referred to as brisket barriers. The brisket barrier 10 comprises a ridge shaped body 12 which, in use, is fixed to a ground surface 42 of the stall assembly 40, extending transversely across the respective stall 11 at or adjacent the front of the stall.

Referring now to FIGS. 2A to 2F, a preferred embodiment of the brisket barrier 10 is shown wherein the body 12 has a convex and curved cross section, which may for example be substantially parabolic in shape, providing a convex and curved, or rounded, external surface to the body 12. The body 12 is elongate and substantially linear in shape, and has first and second edges 16, 18, which, in use, rest upon the ground surface 42.

The barrier 10 may be releasably fixed to the surface 42 by means of screws, nails or other fixing device (not shown). To this end, the barrier 10 is provided with a plurality of recesses, formed in the body 12, each recess being adapted to receive at least one fixing. In preferred embodiments, the body 12 comprises at least one but typically a plurality of recessed sections 22. Each recessed section 22 is defined by a base portion, in the preferred form of a plate 20, which is preferably flat, and walls 24, 25. Advantageously, the base plate 20 is located substantially flush with the base of the body 12, or the plane in which the base of the body 12 lies, such that it contacts the ground surface 42 during use. In the illustrated embodiments, the base of the body 12 is defined by the edges 16, 18 and so the preferred arrangement is that the edges 16, 18 and the plates 20 are substantially coplanar.

The plates 20 preferably run substantially perpendicular with the longitudinal axis of the body 12. In the illustrated embodiments, each recessed section 22 extends from a respective edge 16, 18 towards the longitudinal axis of the body 12. Each recess 22 has opposing side walls 24, which typically extend substantially perpendicular with the respective plate 20, and an end wall 25 which extends between the side walls 24. The end walls 25 are preferably curved (convex with respect to the recess 22) in cross section. This is found to improve the rigidity of the barrier 10.

A fixing slot or aperture 26 is formed in each plate 20 through which a fixing device, for example as a nail, screw, bolt or the like, may, in use, be inserted to secure the body 12 to the ground surface 42. The slots 26 preferably run substantially perpendicular with the longitudinal axis of the body 12, advantageously along substantially the whole length of the plate 20. The arrangement is such that when fixings are in place in the slots 26, the barrier 10 can be moved in a direction perpendicular to the longitudinal axis of the body 12 with respect to the ground surface 42 and fixings. Such movement may be allowed or prevented, as desired, by appropriate loosening or tightening of the fixing means. In an alternative embodiment (not illustrated), a plurality of apertures or slots may be formed in the plate 20, spaced apart along its length, i.e. transversely of the ridge. In some embodiments (not illustrated), one or more slots or apertures may be provided which extend, or are spaced apart, in a direction parallel with the longitudinal axis of the body to allow the position of the barrier to be adjusted in the longitudinal direction.

In a preferred embodiment, the recessed sections 22 occur at intervals along the length of the body 12, preferably at substantially equal intervals along the body 12. In the illustrated embodiment, the recessed sections 22 are provided on each side of the body 12. Advantageously, the recesses 22 on one side of the body 12 are staggered, with respect to the recesses 22 on the other side, preferably with substantially uniform intervals between recesses 22. It is envisaged that this will result in less fixing being required and consequently the brisket barrier 10 being faster and easier to position.

The plates 20, and therefore the recesses 22, advantageously extend substantially to the longitudinal axis of the body 12, but preferably stop short of the longitudinal axis. This allows a relatively large amount of adjustability of the barrier 10, while still providing the body with a solid, or uninterrupted, apex portion 27 to help the rigidity of the body 12.

Advantageously, flanges 30 are provided on the internal surface of the body 12, for example extending from each end wall 25. Preferably, the flanges 30 extend at least partially across the apex of the body 12. The flanges 30 add strength to the barrier 10 and help to reduce its flexibility about its longitudinal axis.

The height of the barrier 10 is typically selected to be sufficiently high that an animal will be encouraged to lie with its body behind rather than on the barrier 10, but not so high that it is prevented from extending its legs over the barrier 10. By way of example, for use with cows in particular, the brisket barrier 10 may be approximately 130 mm in height. Conveniently, the brisket barrier 10 may be manufactured in lengths of approximately 600 mm to 1200 mm. The body 12 may be formed from any suitable material, especially rigid or semi-rigid plastics.

Referring to FIG. 3, a plurality of brisket barriers 10 may be positioned in an adjacent end-to-end manner to create a longer brisket barrier. In preferred embodiments, means for interconnecting adjacent brisket barriers 10 is provided. For example, the brisket barriers 10 shown in FIG. 2 have male connecting means in the preferred form of a flange 32 projecting from each end substantially parallel with the longitudinal axis. The flanges 32 may follow the cross sectional shape of the body 12 while being stepped inwardly of the external surface of the body 12.

A second embodiment of a brisket barrier shown in FIGS. 4A to 4F generally indicated as 110. The barrier 110 is similar to the barrier 10 and like numerals are used to indicate like parts. The barrier 110 does not, however, comprise the flanges 32. Instead, it includes respective female connecting means at each end which, in the present example, are adapted to receive the flanges 32. This may be achieved by making the body 12 open ended so that the flanges 32 of a barrier 10 may fit into a respective open end of a respective barrier 110. Preferably, the flanges 32 engage with the underside of the body 12 of the adjacent barrier 110 and this may conveniently be achieved by selecting the size of the step to be substantially equal to the thickness of the ends of the body 12.

It will be apparent that alternative embodiments of connecting means are possible and, in alternative embodiments, each barrier may have a male connector (e.g. flange 32) at one end of the body and a corresponding female connector (e.g. recess or open end) at the other end, for example in the form of a hybrid of the barriers 10, 110.

Referring to FIGS. 6A and 6B which show a third embodiment of a barrier 210, a flange 50 may be provided along one or both edges 16, 18 of the body 12. The, or each, flange 50 may extend partly or wholly along the length of the respective edge 16, 18, preferably lying in substantially the same plane as the base of the body 12 and/or the plates 20. The plates 20 may be integrally formed with the flanges 50. The flanges 50 add to the rigidity of the barrier 210. It will be seen that the barrier 210 is of the hybrid type referred to above. In this embodiment, the recesses 222 extend substantially to the longitudinal axis of the body 12. Preferably, an even number of recesses 222 is provided on each side of the barrier 210. This is in contrast to the barriers 10, 110 which have an odd number of recesses 22 on one side and an even number on the other side.

Figure 5:
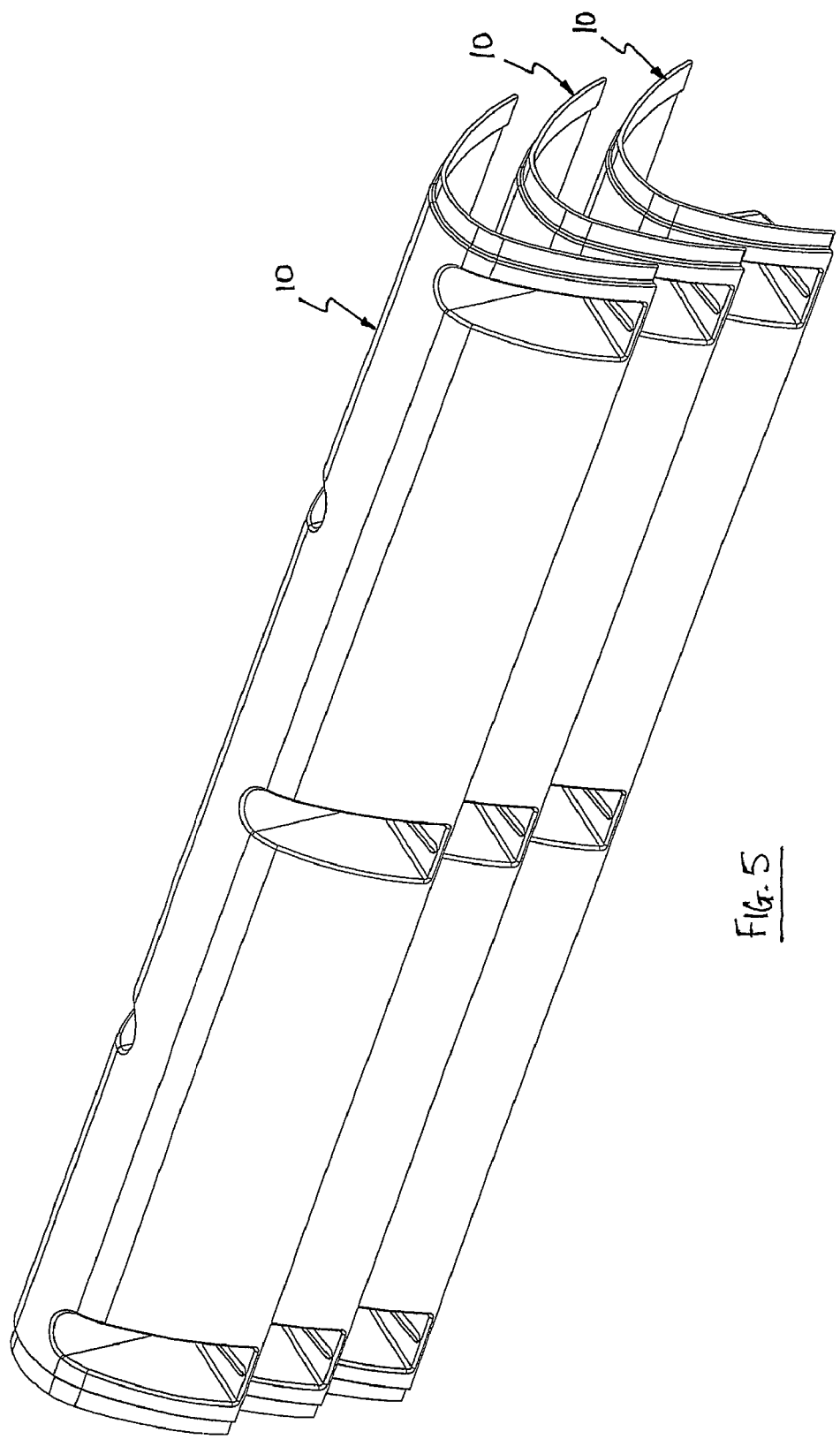
FIG. 5 shows how a plurality of brisket barriers may be stacked.

Referring to FIG. 5, the brisket barriers 10, 110, 210 may be stacked as shown such that the recessed sections 22 of a first brisket barrier 10 may receive the plates 20 of a second brisket barrier 10. As a result, brisket barriers 10 are easier to store when not in use.

In use, the brisket barriers 10, 110, 210 are positioned such that they run transversely across the ground surface 42 of the animal stall assembly 40 near the head of the stall 11 such that when an animal (not shown) steps into the stall 40 (which typically is a step up from a walkway) the animal moves forward towards the brisket barrier 10, 110, 210. The brisket barrier 10, 110, 210 is secured to the ground surface 42 of the stall by fixing means as described above. An operator (not shown) applies the fixings such that the brisket barrier 10 may move in the back and forth direction with respect to the ground surface 42 and fixings.

Where a plurality of stalls 11 are provided adjacent one another, a plurality of brisket barriers 10, 110, 210 may be laid adjacent one another, preferably interconnected as described above, such that the brisket barriers 10, 110, 210 run across all of the stalls 11.

When the animal lies down in the stall 11, the chest of the animal should be located near or adjacent the barrier 10, 110, 210. A typical purpose of the barrier 10, 110, 210 is to position the body of the animal such that the rear of the animal hangs off the rear of the stall 11 and that the head of the animal is not positioned too far forward in the stall 11. The animal may lie with one or both front legs extended over the brisket barrier 10, 110, 210. For this reason it is preferable that the brisket barrier is made of a relatively soft deformable, yet self-supporting, material. The convex shape of the brisket barrier 10, 110, 210 may also provide added rigidity. In addition, when some animals, e.g. cattle, stand up they naturally step forward in the stall 11. In this case the animal may step over and forwards of the brisket barrier 10, 110, 210 in the stall 11.

The present invention is not limited to the embodiment(s) described herein, which may be amended or modified without departing from the scope of the present invention.

The invention claimed is:

1. A brisket barrier for an animal stall, the barrier comprising a body shaped to define a ridge having an apex that is curved in transverse cross section, the body having at least one recessed section formed therein and extending into said ridge, said at least one recessed section including at least one slot formed therein extending in a direction transverse of the ridge and adapted to receive a fixing device, said at least one slot being adapted to receive said fixing device in a plurality of different locations, said locations being spaced apart in a direction transverse of the ridge, the brisket barrier being installable within an animal stall transverse to the orientation of the stall whereby an animal lying in the stall is able to extend its legs over the barrier.

2. A brisket barrier as claimed in claim 1, wherein said at least one recessed section includes a base portion in which said at least one slot is formed, said base portion being arranged to face, in use, a ground surface on which said barrier is mounted.

3. A brisket barrier as claimed in claim 2, wherein the body has a base for engagement with said ground surface, and said base portion of said at least one recessed section is substantially flush with said base of the body.

4. A brisket barrier as claimed in claim 1, wherein said at least one recessed section extends from an external surface of said ridge towards a notional plane that bisects the ridge longitudinally.

5. A brisket barrier as claimed in claim 4, wherein said at least one recessed section extends from said external surface substantially to said notional bisecting plane.

6. A brisket barrier as claimed in claim 4, wherein said ridge has a base and said at least one recessed section extends from the base of the ridge.

7. A brisket barrier as claimed in claim 1, wherein said at least one recessed section terminates in an end wall that is curved in transverse cross section.

8. A brisket barrier as claimed in claim 1, wherein at least one of said recessed sections is provided in each side of the ridge.

9. A brisket barrier as claimed in claim 8, wherein said at least one of said recessed sections provided in one side of the ridge are staggered with respect to said at least one of said recessed sections in the other side of the ridge in a longitudinal direction.

10. A brisket barrier as claimed in claim 1, wherein a plurality of said recessed sections are provided in each side of the ridge.

11. A brisket barrier as claimed in claim 1, wherein male or female connecting means are provided at each end of the body.

12. A brisket barrier as claimed in claim 1, wherein the ridge has a base, a respective flange being provided substantially at the base of the ridge along at least one side of the ridge, the respective flange extending longitudinally of the ridge.

13. An animal stall assembly comprising at least one animal stall having at least one brisket barrier as claimed in claim 1 located at an end of said at least one animal stall.

14. An animal stall assembly as claimed in claim 13, comprising a plurality of brisket barriers and wherein said brisket barriers are arranged in at least one row, adjacent barriers being longitudinally aligned and interconnected.

15. A brisket barrier as claimed in claim 1, wherein said body has a convex and curved substantially parabolic shape.

16. A brisket barrier for an animal stall, the barrier comprising:
a body shaped to define a ridge having an apex that is curved in transverse cross section, said body having a base for engagement with a ground surface and having at least one recessed section formed in said body with said at least one recessed section extending into said ridge from an external surface of said ridge towards a notional plane that bisects said ridge longitudinally;
said at least one recessed section including a base portion arranged to face, in use, a ground surface on which said barrier is mounted with said base portion of said at least one recessed section being substantially flush with said base of said body;
said base portion including at least one aperture formed therein extending in a direction transverse of said ridge and adapted to receive a fixing device, said at least one aperture being adapted to receive said fixing device in a plurality of different locations, said locations being spaced apart in a direction transverse of said ridge, said brisket barrier being installable within an animal stall transverse to the orientation of the stall whereby an animal lying in the stall is able to extend its legs over said brisket barrier.

17. A brisket barrier as claimed in claim 16, wherein said at least one recessed section extends from said external surface substantially to said notional bisecting plane.

18. A brisket barrier as claimed in claim 16, wherein at least one of said recessed sections is provided on either side of said ridge.

19. A brisket barrier as claimed in claim 18, wherein said at least one of said recessed sections provided in one side of said ridge are staggered with respect to said at least one of said recessed sections in the other side of said ridge in a longitudinal direction.

* * * * *